March 15, 1960   N. MARKOFF ET AL   2,928,572
VALVE AND REGISTER CONTROL MECHANISM
Filed Sept. 6, 1957   9 Sheets-Sheet 1

JOHN C. KERR
NICHOLAS MARKOFF
  INVENTORS

BY Edmund W.E. Kamm
          ATTORNEY

JOHN C. KERR
NICHOLAS MARKOFF
INVENTORS

BY Edmund W.E. Kamm
ATTORNEY

March 15, 1960 N. MARKOFF ET AL 2,928,572
VALVE AND REGISTER CONTROL MECHANISM
Filed Sept. 6, 1957 9 Sheets-Sheet 4

JOHN C. KERR
NICHOLAS MARKOFF
INVENTORS

BY Edmund W.E. Kamm
ATTORNEY

March 15, 1960 N. MARKOFF ET AL 2,928,572
VALVE AND REGISTER CONTROL MECHANISM
Filed Sept. 6, 1957 9 Sheets-Sheet 5
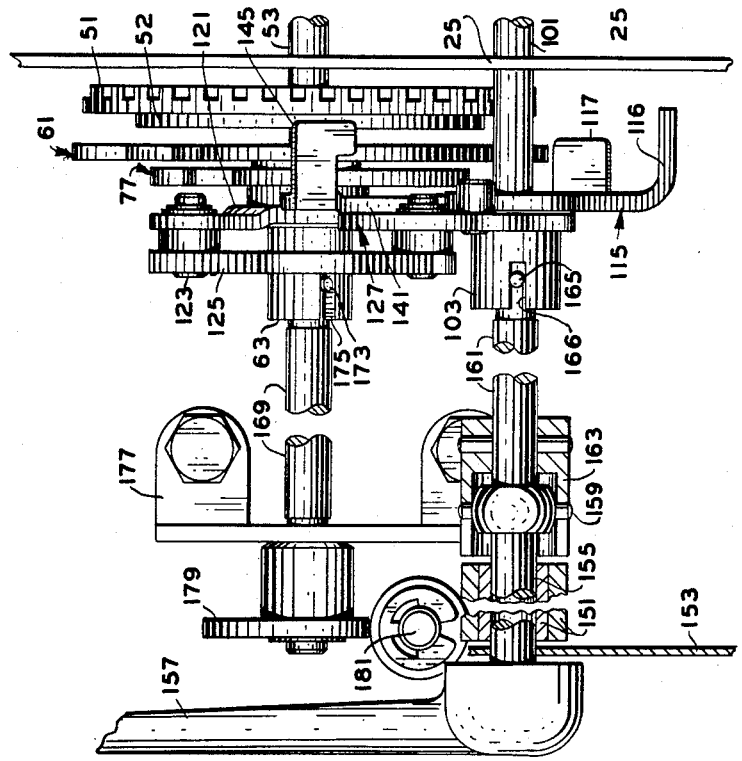
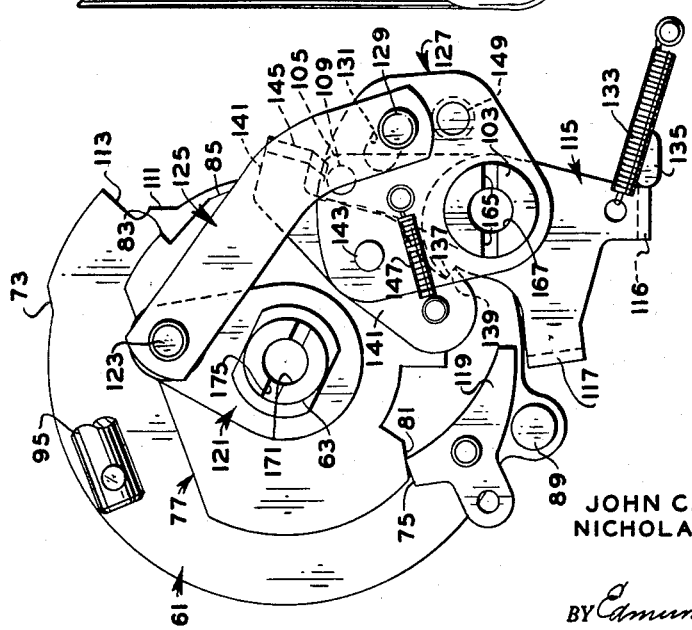
JOHN C. KERR
NICHOLAS MARKOFF
INVENTORS
BY Edmund W. E. Kamm
ATTORNEY

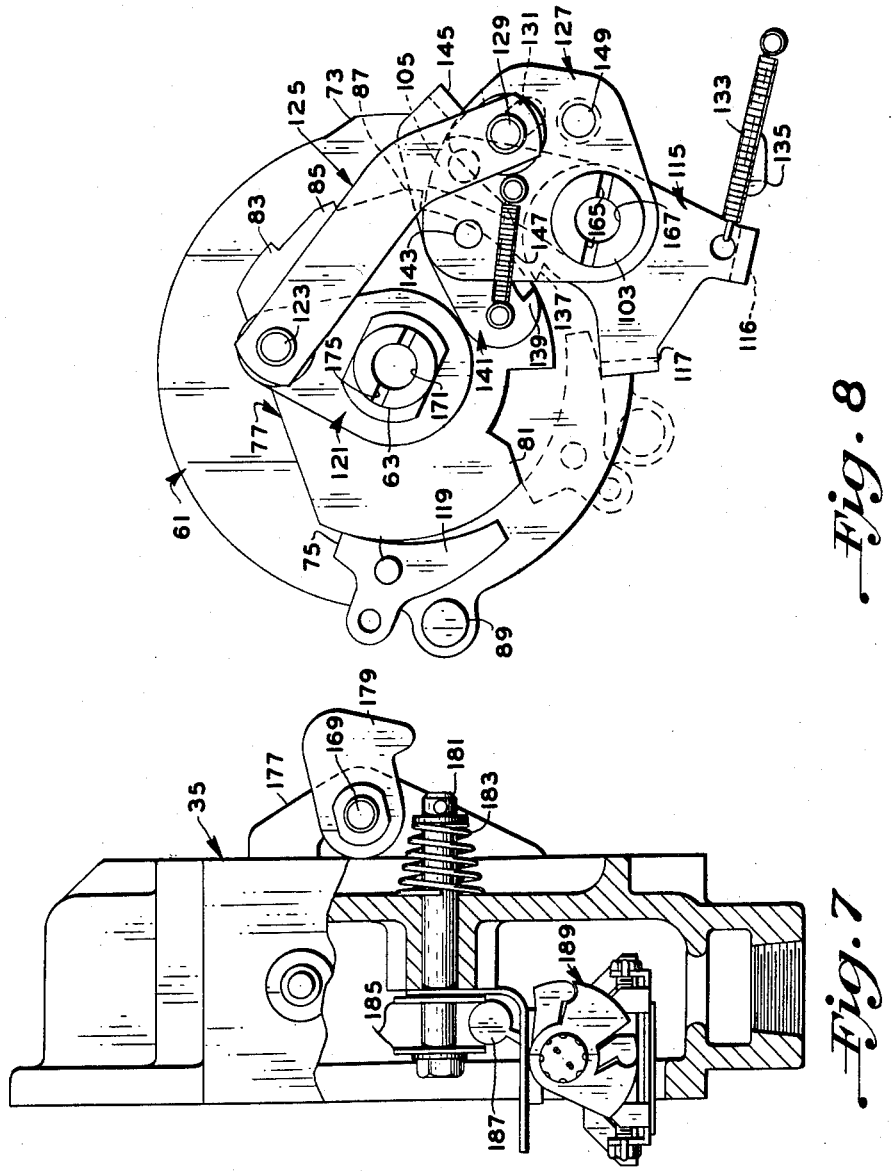

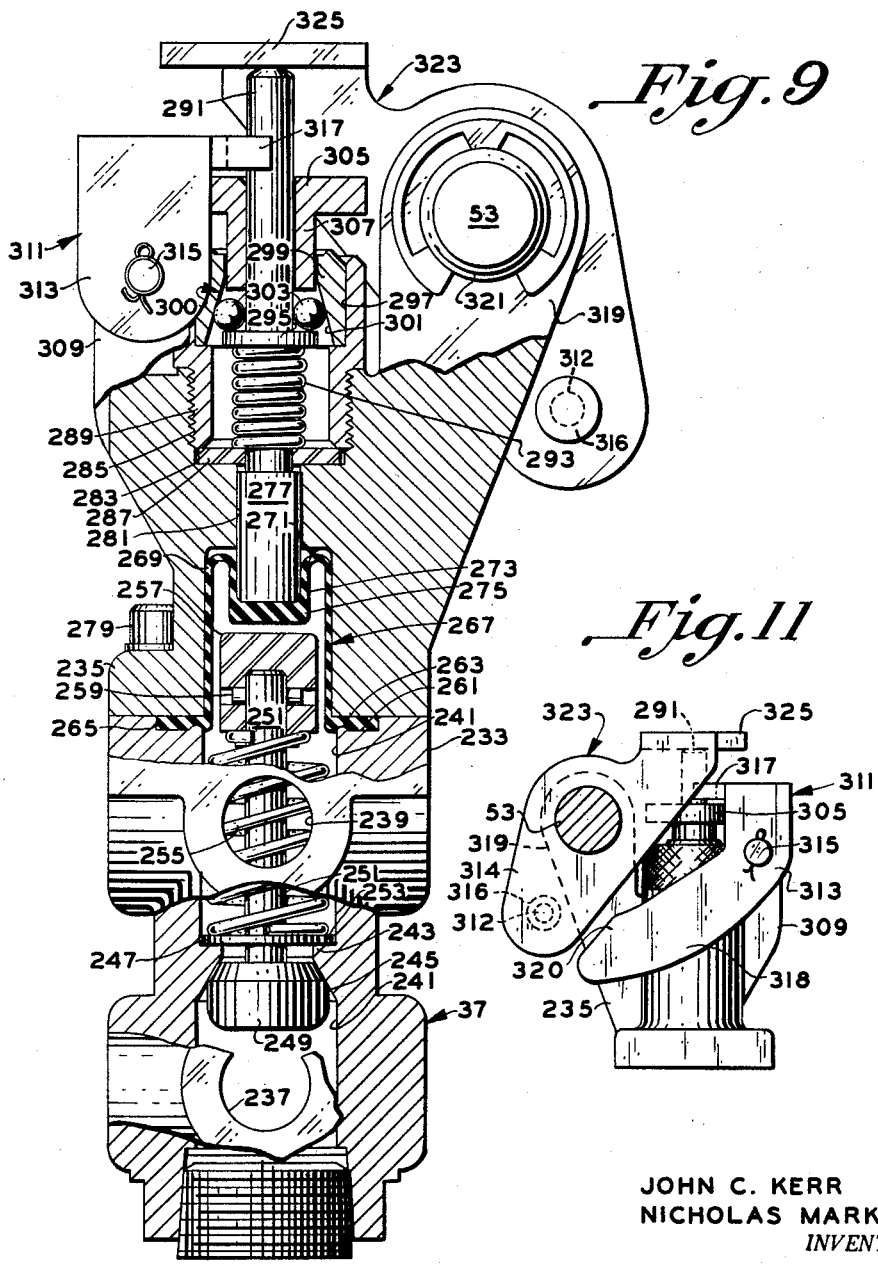

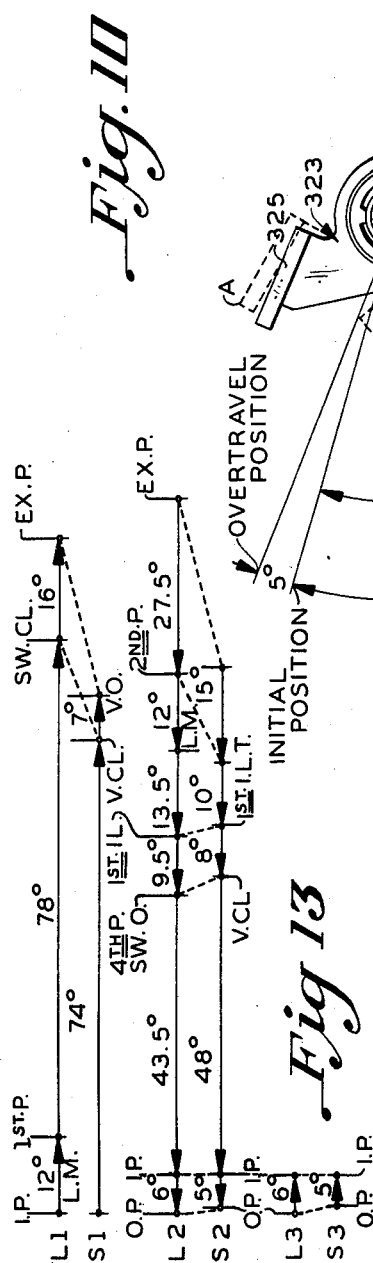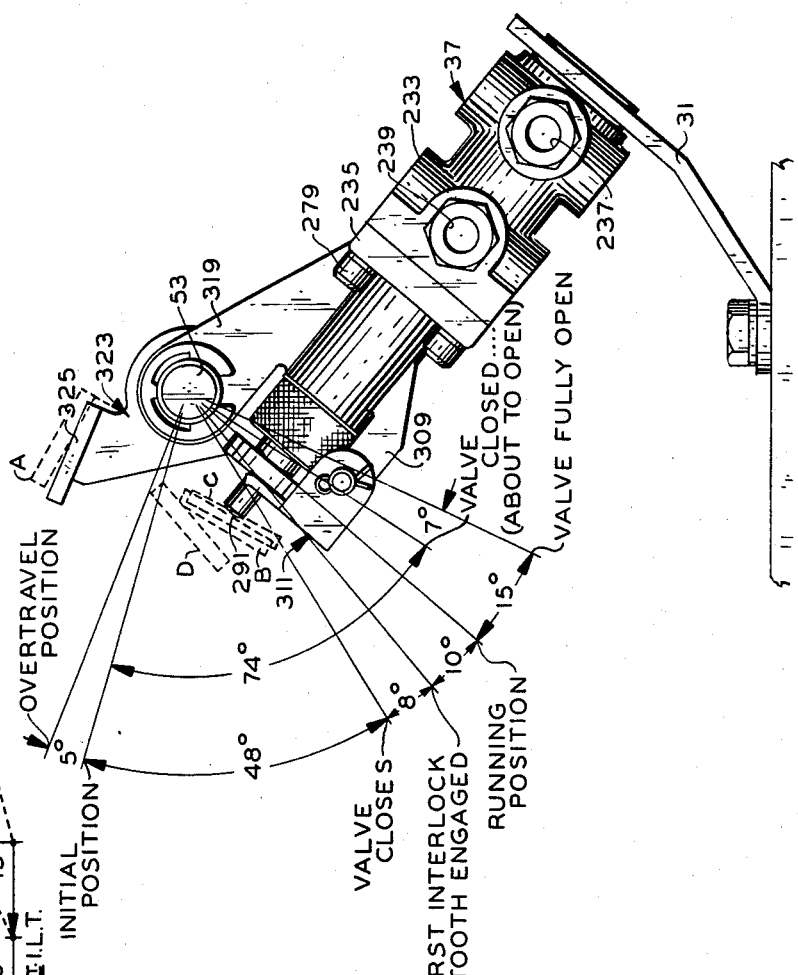

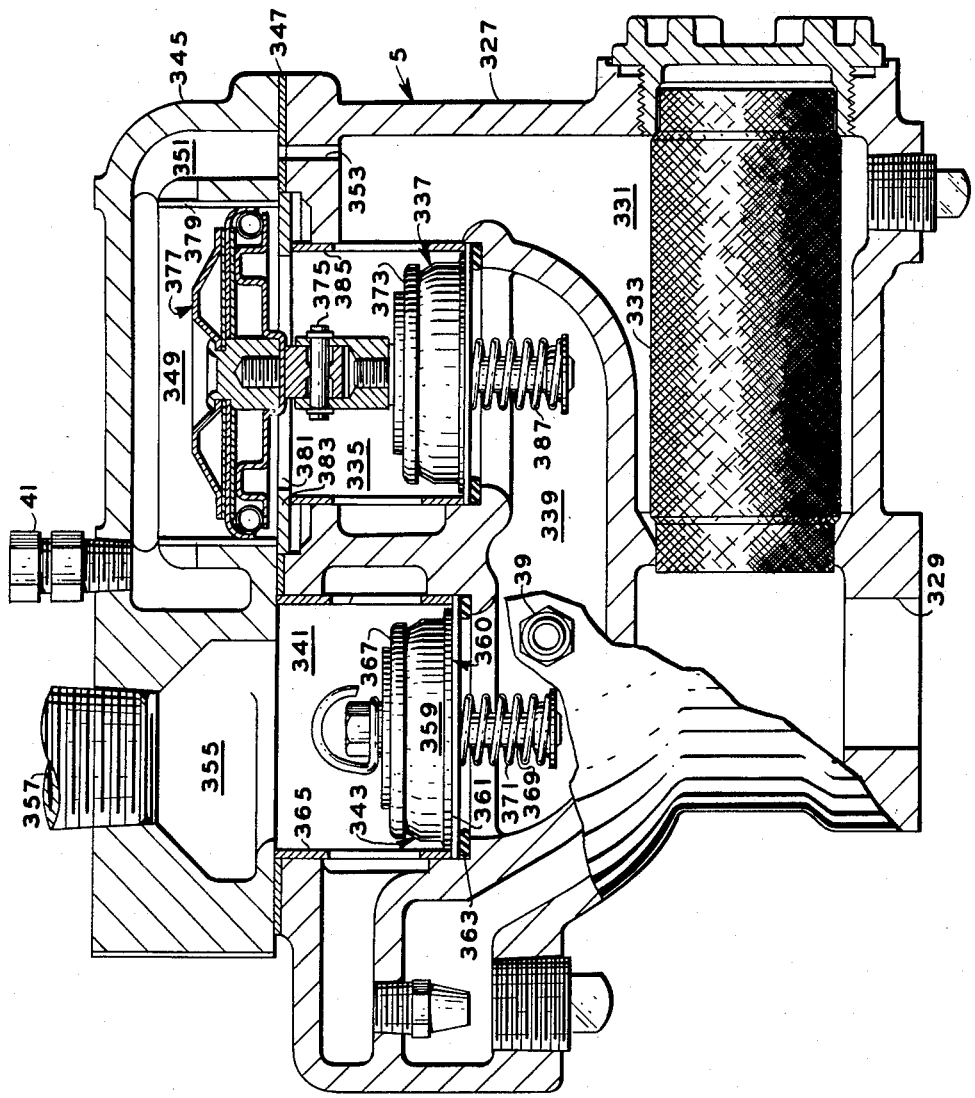

United States Patent Office 2,928,572
Patented Mar. 15, 1960

2,928,572

VALVE AND REGISTER CONTROL MECHANISM

Nicholas Markoff and John C. Kerr, Fort Wayne, Ind., assignors to Tokheim Corporation, Allen County, Ind.

Application September 6, 1957, Serial No. 682,503

22 Claims. (Cl. 222—35)

This invention relates to a valve and register control mechanism. More specifically it relates to a mechanism for opening and closing the flow control valve of a liquid fuel dispenser to control the supply of fuel to the dispenser from a remotely located pump. Usually the pump is connected to be started and stopped by a switch disposed in the dispenser which is operated in timed relation with the valve mechanism under the control of an interlock mechanism associated with the resettable computing register usually provided in the dispenser. However, since several dispensers are usually connected to the same pump, which may be started by any one of the pedestal switches, it is necessary to provide a flow control valve to prevent fuel from being drawn from any of the dispensers which may be connected to the pump except the one which was operated to start the pump.

If such a valve were not provided in each dispenser, it would be possible to dispense fuel from any of the other dispensers, without resetting the register thereof, when one dispenser is operating, with the result that the amounts registered on the computer of the improperly operated dispenser would not correspond with the amounts actually delivered therefrom in the final transaction.

Further, in such case, all of the dispensers would be subjected to pump pressure upon every operation of the pump and failure of the hose, visigage or any liquid conduit in an unattended dispenser might not be noticed, so that a serious fire hazard as well as a substantial loss of a relatively expensive fuel might result.

The same difficulties would be encountered if the flow control valve of a dispenser is not closed when its switch is open. Provision has therefore been made to insure closure of the pilot valve, which controls the flow control valve of each dispenser, prior to opening of the associated switch. The operation of the switch in timed relation to the operation of the register resetting means is also fully explained herein.

The structure of this pilot valve, the valve operating mechanism, which includes the timing mechanism, as well as the combination of these mechanisms is believed to be new and patentable.

The construction and operation of these mechanisms separately and in combination will become apparent from a study of this specification and the drawings which are attached hereto, made a part hereof and in which:

Figure 5 is a front elevation showing the register control and interlock mechanism in its initial condition.

Figure 6 is a side elevation of the mechanism of Figure 5 showing the control lever and switch operating mechanism connected thereto.

Figure 7 is an elevation with parts in section of the switch and switch operating mechanism.

Figure 8 is a front elevation showing the register control and interlock mechanism in the reset condition which it occupies prior to the closing of the switch and the opening of the pilot valve.

Figure 9 is an elevation with parts in section showing the pilot valve and associated elements.

Figure 10 is an elevation similar to Figure 3 but showing the relation between the events of the angular displacement of shaft 53 and the pilot valve events.

Figure 11 is a rear elevation of the pilot valve showing the clutch releasing mechanism.

Figure 12 is a vertical sectional view of the main or flow control valve mechanism.

Figure 13 is a chart which correlates the various rotative displacements of the pilot valve and switch operating mechanisms and the various events in their cycles.

Figure 1:
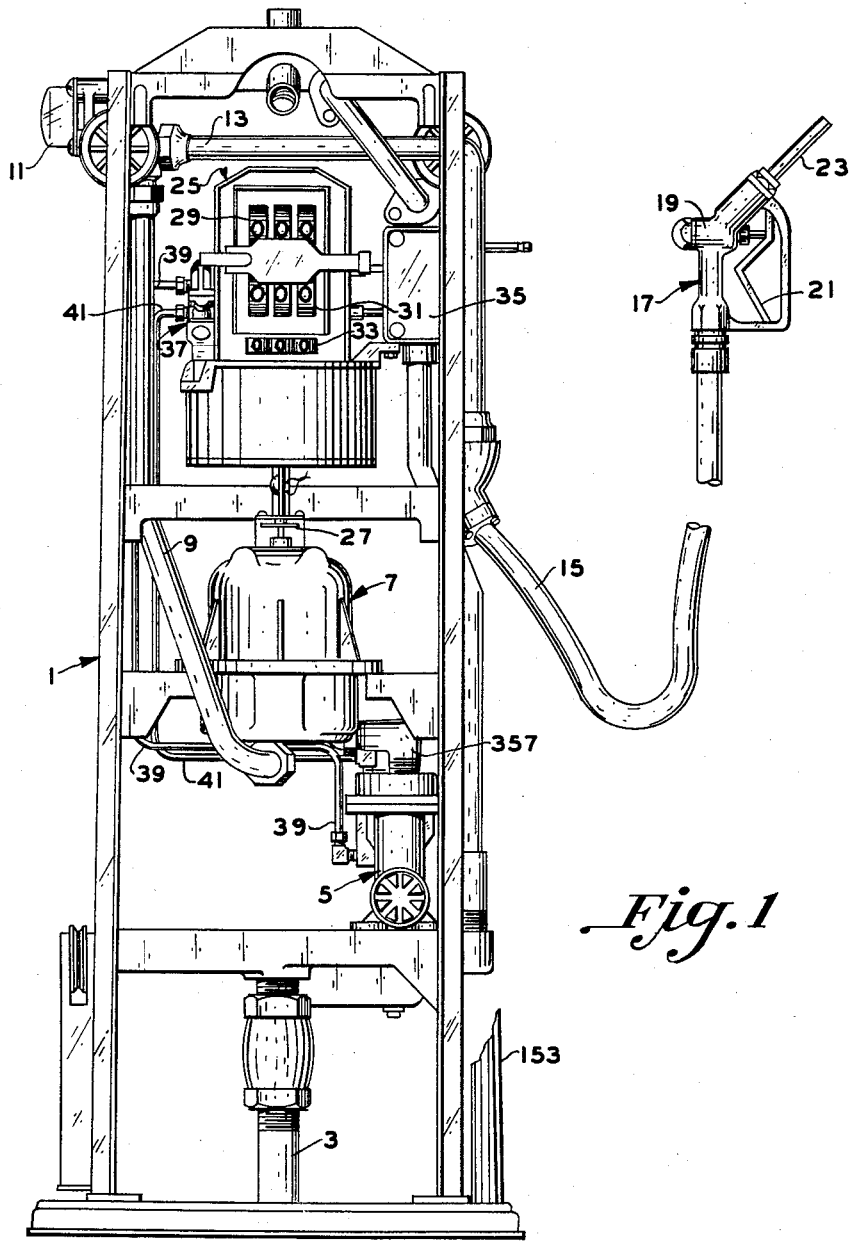
Figure 1 is a front elevation of a liquid dispenser for use with a remotely located pump.

Referring first to Figure 1, numeral 1 represents a dispenser or pedestal of the remote control type which is supplied with liquid fuel under pressure through pipe 3 which communicates with the main or flow control valve mechanism indicated generally by 5. The outlet of the valve is connected with the inlet of a meter 7 while the meter outlet is connected by pipe 9 to a visigage 11. The latter is connected by pipe 13 and hose 15 to a dispensing nozzle 17 which has a valve 19, controlled by a trigger 21 to control the flow of liquid to the discharge spout 23.

The meter 7 is connected to drive the registering mechanism 25 through drive means 27. The register is preferably of the "computing" type having a cost register 29, a gallons register 31 and a price indicating register 33.

A switch box 35 is mounted on the registering mechanism at one side and a pilot valve 37 is mounted thereon at the other side and is connected by tubes 39 and 41 with the main valve 5.

Figure 2:
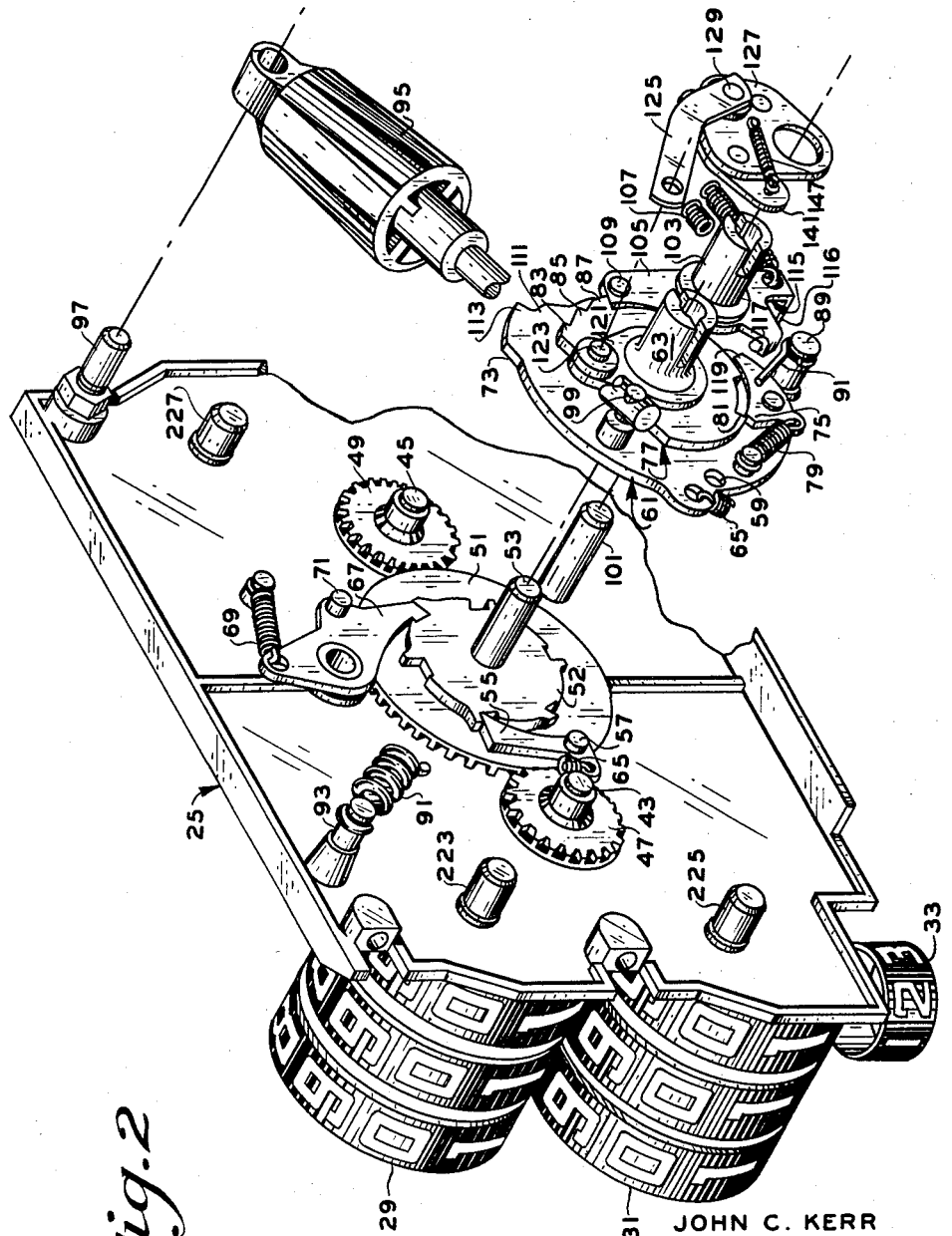
Figure 2 is a perspective view of the computing registering mechanism, its resetting and control mechanism.
Figure 3:
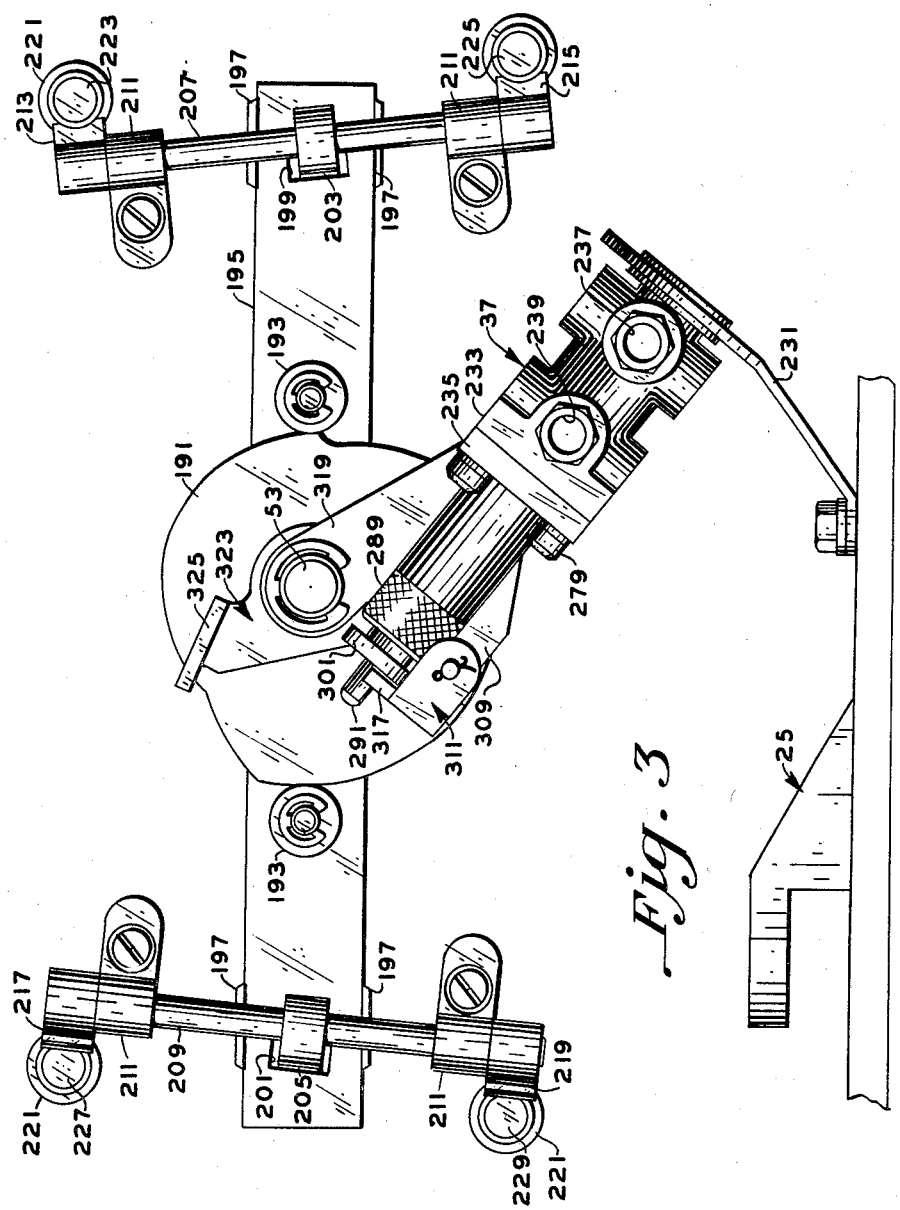
Figure 3 is an elevation of the end of the registering mechanism opposite to that shown in Figure 2 with the pilot valve mounted thereon.

The registering mechanism which is shown in detail in Figures 2 and 3 comprises in addition to the parts already enumerated, reset shafts 43, 45 on which are fixed gears 47, 49 which mesh with a gear 51 which is rotatable on shaft 53. A ratchet 52 is connected to drive gear 51 and is adapted to be driven by a pawl 55 which is pivotally mounted on pin 57 supported in the hole 59 in the cam disc or resetting member 61. This disc is rotatably mounted on a projecting portion of a hub 63 which is fixed to shaft 53. A spring 65 attached at opposite ends to the pawl 55 and disc 61 to urge the pawl into engagement with the ratchet.

A holding pawl 67 is also urged into engagement with the ratchet by a spring 69 and carries a pin 71 which is positioned for actuation by cam 73 on the disc.

The disc or member 61 has pivotally mounted thereon, a cocking pawl or dog 75 which is urged into engagement with the edge of a control element 77 by a spring 79. The edge of the control element is notched at one side to provide a tooth or abutment 81 which is adapted to engage the cocking pawl and is provided at its opposite side with three interlock teeth 83, 85 and 87.

The member 61 carries an axially directed pin 89 and a resetting spring 91 is connected at one end to this pin while the other end is anchored on a fixed projection 93. A dashpot 95 is pivotally mounted at one end on a fixed stud 97 and at the other on a pin 99 fixed to the resetting member 61.

A shaft 101 is rotatably mounted in the registering mechanism and has a hub 103 fixed to its projecting end.

A latch pawl 105 is rotatably mounted on the shaft 101 and is urged toward the edge of the control element 77, for cooperation with teeth 83, 85 and 87, by a spring 107. The pawl carries a pin 109 which extends over the edge of the resetting member 61 for operation by a cam 111 formed thereon and for cooperation with a stop 113, also formed thereon, to limit the clockwise rotation of the member.

A tripping lever 115 is rotatably mounted on the hub 103 and has a bent over end 117 which is adapted to engage the tail 119 of dog 75 upon clockwise rotation, so as to rotate the dog counterclockwise and so as to engage the edge of the control element 77, when the dog is out of reach of the lever 115, to limit the rotation of the hub in said direction.

The hub 63 has fixed to it an upstanding lever or arm 121 which is connected by a pin 123 to one end of a link 125, the other end of which is connected to a wrist plate or actuator 127, as is best shown in Figures 5 and 8, by means of a pin 129 which enters a lost motion slot 131 in said plate. The wrist plate is fixed to the hub 103.

As better shown in Figs. 5 and 8, a spring 133 is connected to urge the tripping lever 115 counterclockwise until ear 116 thereof moves into engagement with a fixed stop 135. This lever is formed with a tooth 137 which is adapted to be engaged by a tooth 139 of a pawl lever 141 which is pivotally mounted on a pin 143 carried by the wrist plate. The opposite end of the lever 141 is bent over at 145 into the path of a stop 113 formed on the cam disc 61. A spring 147 connects the lever 141 and the plate 127 to urge the tooth 139 into engagement with tooth 137. A stop pin 149 is mounted to project from the rear side of plate 127 and cooperates with the right hand edge of lever 115 to limit the rotation of the plate when the ear 117 of the lever engages the edge of element 77.

Referring to Figures 6 and 7, a bearing 151 is suitably mounted on the interior side of the housing 153 and a shaft 155 is rotatably mounted in said bearing. A handle or lever 157 is mounted on the end of the shaft which projects through the housing while a connector means including a cross-pin 159 is fixed to the other end.

A connecting shaft 161 has a socket 163 at one end to receive the connector means and has a cross-pin 165 at the other end which is adapted to enter a slot 166 in hub 103 while the shaft enters the central bore 167. Thus as the lever 157 is rocked, the wrist plate which is fixed to hub 103 will follow, as will shaft 101 to which the hub is fixed.

The hub 63 drives a shaft 169, which has one end entered in the bore 171 of the hub, by means of the pin and slot connection 173, 175. The other end of the shaft is supported in a bracket 177 and carries the switch operating lever or cam 179 which is adapted to move the switch rod 181 leftward (Fig. 7) against the action of spring 183. The rod carries flanges 185 which span the actuator 187 of the snap switch 189. As the actuator 187 moves counterclockwise a substantial distance, a spring (not shown) is stressed, and at a certain point in the path of the actuator the spring will "snap" the switch closed. A similar clockwise travel of the actuator 187, through a substantial distance, is required to cause the switch spring to snap the switch open. Thus there is in this mechanism substantial lost motion of a substantially constant amplitude, between the actuating lever and the switch. This lost motion device serves a purpose described below.

Referring now to Figure 3 which shows the end of the registering mechanism opposite to that shown in Figure 2, the shaft 53 projects through the mechanism and has fastened to it a cam 191 which actuates rollers 193 mounted on a bar 195 which is slidably mounted in guides 197. Each end of the bar is provided with a hole 199, 201 into which projects a lever 203, 205 mounted on a shaft 207, 209 which is in turn rotatably supported in bearings 211. Gear sectors 213, 215 and 217, 219 are mounted at the top and bottom of the respective shafts 207, 209 and mesh with circular racks 221 on the individual register shafts 223, 225, 227 and 229. The general function of this structure is to clutch the numeral wheels of the individual registers 29, 31 to the meter drive while simultaneously declutching them from the resetting means and vice versa as explained in more detail below.

Also mounted on the registering mechanism adjacent the cam 191 is the bracket 231 on which the pilot valve, indicated generally by numeral 37, is mounted. This valve which is shown in more detail in Figure 9, includes a body 233 and a cap 235. The body defines an inlet 237, an outlet 239 and a generally tubular bore 241 connecting the inlet and outlet.

The body has a flange 243 extending radially inwardly with respect to the bore and is formed to provide a valve seat 245 on its lower side and a spring seat 247 on its upper side.

A valve 249 is disposed to engage said seat and has a stem 251 extending generally coaxially of and upwardly in said bore. A washer 253 rests on the seat 247 and the stem extends upwardly through the washer, through a helical compression spring 255 which rests on the washer and into a tappet 257 which is held on the upper end of the stem by pin 259. The other end of the spring rests on the lower side of the tappet and thus acts through the tappet and stem to hold the valve seated. The liquid pressure on the valve aids the spring.

The upper end of the body 233 is provided with a counterbore 261 and with an axially extending, circular bead 263 adjacent the bore to receive the radial end flange 265 of the diaphragm 267. The diaphragm has preferably a cylindrical outer wall 269 which is joined at its upper end, by a reverse bend 271 to an inner cylindrical wall 273 of smaller diameter, which extends for only a portion of the height of the outer wall and which is closed at the bottom by a transverse wall 275 so as to form a pocket to receive the lower end of a valve operating push rod 277. The cap 235 is held on the body 233 by screws 279 which serve to compress the diaphragm flange 265 so as to seal the joint between the cap and body.

The cap is provided with a bore 281 which slidably receives the lower end of the plunger 277 and guides it and with a counterbore 283 which is threaded internally at 285 to receive a washer 287 and a bushing 289 which is screwed into place to hold the washer against the bottom of the counterbore. The opening in the washer is of less diameter than bore 281 and the upper end 291 of the push rod or plunger 277 is reduced in diameter so as to pass through the hole in the washer.

A helical compression spring 293 rests upon the washer 287 at it lower end and a washer 295, mounted on the reduced portion 291 of the plunger, rests on the upper end of the spring. To form a clutch indicated generally by the numeral 300, the bushing is counterbored at 297 to receive a clutch member 299 which is provided with a downwardly diverging conical bore 301. A number of metal balls 303 rest on washer 295 and are urged thereby axially upwardly against the wall defined by the conical bore which in turn forces them into gripping relation with respect to the reduced end 291 of the plunger. Thus, when the plunger is depressed, it will be held depressed by the clutch mechanism. In order to release the clutch, a collar 305 is slidably mounted on the plunger. The collar has an axially directed flange 307 which is adapted to enter the bore 301 and to depress the balls against the action of the spring 293 to release the plunger for upward movement.

The cap is provided with a laterally projecting ear 309 on which is mounted a clutch release lever 311. This lever has two spaced, downwardly extending arms 313 which span the ear and which are pivotally mounted on a pin 315 supported in the ear. The part of the lever 311 which connects the top ends of the arms has two parallel projections 317 which extend substantially perpendicular to the top ends of the arms and toward said plunger so that the latter is received between them. Thus, as the lever rotates clockwise (Fig. 9) the projections will depress the collar 305 to release the clutch.

A second ear 319 extends from the side of the cap opposite to ear 309 and the ear is perforated at 321 to rotatably receive the shaft 53.

A lever 323 is fixed to the shaft and has a laterally projecting ear 325 which is adapted to move into and out of contact with the upper end 291 of the push rod or plunger 277 to actuate it to open the valve 249. The lever and ear constitute a lost motion device which permits movement of the control element and lever 323 without affecting the condition of the valve.

The counterclockwise rotation of the clutch release lever 311 (Fig. 11) referred to above, is effected by a roller 316 which is mounted on an arm 314 of lever 323 by means of a pin 312. One of the arms 313 of lever 311 has a portion 318 which extends transversely of the valve cap 235 and is provided with a cam 320 which lies in the path of the roller. Upon each passage of the roller over the cam, in either direction, the lever 311 is rotated counterclockwise (Fig. 11) which is clockwise in Figure 9, so that it will depress the collar 305 to release the ball clutch to free the plunger 277—291. The timed operation of the lever 311 by the cam and roller is set forth in more detail below.

*Flow control valve*

As will be seen from Figures 1 and 12, the main or flow control valve 5 comprises a body 327 which has an inlet 329, a strainer chamber 331 which is fitted with a strainer 333, a control valve chamber 335 which is fitted with a unitary control valve assembly 337 and a discharge chamber 339 which connects the control valve chamber 335 with a check valve chamber 341 which contains a unitary check valve assembly 343. The chamber 339 communicates with tube 39 which is in turn connected with the outlet 239 of valve 37. A valve cap 345 is bolted to the body so as to compress the gasket 347. The cap defines a motor chamber 349, the top of which is connected by a channel 351 with a restricted orifice 353 in the body which communicates with the chamber 331. The top of the motor chamber also communicates with the tube 41 which is connected to the inlet 237 of valve 37. The cap also defines a discharge chamber 355 which communicates with the check valve chamber 341 and a pipe 357 which is connected to the inlet of meter 7.

The main valve assembly 337 is very similar to the check valve assembly 343 so that only one need be fully described. The check valve assembly comprises a seat member 359 in which nests a stem guide and spring seat member 360, having a flange 361 resting on a gasket 363 and which is forced downwardly by the cap 345 and a multi-ported sleeve 365 when the cap is bolted in place on the body. The check valve 367 has a stem 369 which passes through the guide and the spring 371 acts on the spring seat and stem to hold the valve on its seat.

The main valve 373 is of similar construction and operation with the exception that the valve stem is connected by a coupling which includes a pin 375 to a piston 377 which operates in a sleeve 379 in the motor chamber 349. The piston may be of any desired construction which will respond to a differential pressure which is applied to it in a direction to open the valve, that is, in an upward direction. The piston is exposed to the fluid pressure in chamber 335 through the port 381 defined by a ring or washer 383 which transmits mechanical pressure from the cap 345 to a ported sleeve 385 to hold the valve assembly 337 in place on the body. The spring 387 holds the valve 373 closed until the differential pressure on the piston reaches a value at which the spring and the differential pressure on the valve are overcome.

The operation of the pilot valve and control valve system is briefly as follows:

Whenever the pilot valve 249 is closed, the pressure from the main valve body inlet 329 is applied to the under side of the motor piston 377 through chamber 331, ports in sleeve 385, chamber 335 and the port 381 and also to the top of valve 373. The same pressure is also applied to the top of the piston from chamber 331 through the restricted orifice 353, channel 351 and the chamber 349. Since these pressures are equal under the stated condition the differential pressure is zero and therefore spring 387 holds the control valve 373 closed.

At the proper time in the dispensing cycle as will be set forth in detail below, pilot valve 249 will be opened so that the top side side of piston 377 will be exposed to substantially the same pressure as that which exists in the chamber 339 by reason of the channel established from 339 to 349 through tube 39, valve body bore 241 and tube 41. No action ensues until the nozzle valve 19 is opened by its trigger 21. This will reduce the pressure in chambers 355, 341 and 339 lines 39 and 41 and in the chamber 349 because the passage controlled by the pilot valve has a greater flow carrying capacity than the restricted orifice 353. Consequently liquid will be drained from the top of the piston faster than it can be replaced through orifice 353. A differential pressure will thus be applied to the piston in an upward direction which will overcome the pressure on the valve 373, which has a smaller area than the piston, and the pressure of the spring 387. The valve 373 will therefore open and permit liquid to flow from chambers 331 and 335 to chamber 339, through the check valve 367, chambers 341, 355 and pipe 357 to the meter and nozzle.

It should be noted that throttling the nozzle valve 19 will have the effect of impeding the escape of liquid from the top side of the piston so that the pressure above the piston is nearer to that in chamber 335 and thus the differential pressure acting on the piston would become less and the spring and the forces tending to close the valve 373 would adjust the valve to a corresponding intermediate position. Thus the valve 373 would respond to throttling of the nozzle valve with a corresponding throttling effect on the flow from chamber 331 to chamber 339 and would thus maintain chamber 339 at a lesser pressure than chamber 331 so that the valve would remain in an open, though throttled condition. Were this not the case and if the pressure in chambers 339 and 349 reached a substantial balance with that in chamber 331, the valve would close fully to stop flow as it does when the nozzle valve is closed. The ability of the valve 373 to modulate the flow to the meter, that is, to throttle the flow proportionally as the nozzle valve is throttled is important since it prevents full pump pressure from being applied to the nozzle valve and makes the nozzle valve easier to operate and smoother in operation. It also prevents the operation of one nozzle from being adversely affected by the opening or closing of the nozzles at other dispensers which may be served by the same pump.

*Timed operation of the mechanisms*

As will be seen from an inspection of Figures 4, 10 and 13, the switch operating lever, pilot valve and register functions occur in a correlated and timed sequence which will now be described.

In the initial position of the lever 157, the spring 91 is cocked or loaded; the registers are declutched from the meter and are clutched to the resetting shafts 43, 45 by the cam mechanism 191, 195 etc.; the pilot valve 249 is closed and the lever 323 occupies the full line position Figure 10; the wrist plate 127, control element 77 and resetting member occupy the positions shown in Figure 5 and the latch pawl 105 is in engagement with the interlock tooth 87 of the control element.

Figure 4:
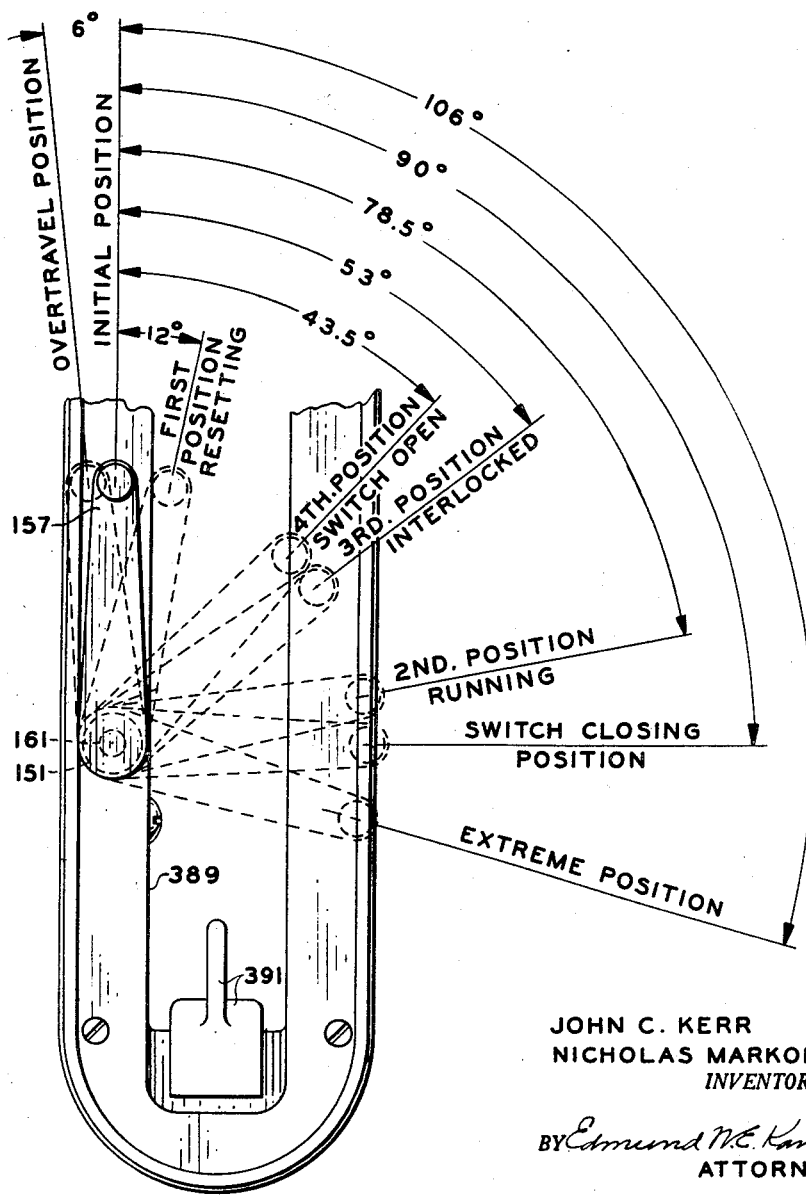
Figure 4 is an elevation of the nozzle support, nozzle boot and single control lever showing the position which the lever occupies at the various events of the operating cycle.

The first event of the cycle is the movement of the manually operable lever 157 clockwise substantially 12 degrees to the first or resetting position shown in Figure 4. There is no corresponding movement of the switch and pilot valve operating means which includes control element 77 and shaft 73 because these parts remain locked by pawl 105 and tooth 87. The 12 degree rotation is permitted by the lost motion connection 129, 131 (Fig. 5) between the wrist plate 127 and link 125.

The stated rotation of the lever and wrist plate is transmitted through pawl lever 141 to the tripping lever 115 which rotates clockwise (Fig. 5) and the ear 117 thereof moves the tail 119 of dog 75 in a counterclockwise direction and disengages the dog from the tooth or abutment 81 of the control element 77. The resetting member 61 is thus freed to be rotated clockwise by the resetting spring 91 and the resetting of the registers is effected by means of the elements 43 to 55 Fig. 2.

The pawl 141 is disengaged from the tripping pawl tooth 137 by the stop 113 on member 61 which strikes the ear 145 of the pawl 141. The rotation of member 61 is limited by contact between the stop 113 and pin 109 of the latch pawl.

After resetting is completed and just prior to the completion of the clockwise rotation of member 61, the cam 111 thereof engages pin 109 of latch pawl 105 and rotates the latter out of engagement with the tooth 87 thus freeing the control element 77 for clockwise rotation by lever 157.

When this lever has been rotated substantially an additional 78 degrees, the wrist plate 127, link 125 and lever 121 will have rotated the shafts 53 and 169 through about 74 degrees. During this rotation the mechanism operated by cam 191 (Fig. 3) has declutched the registers from the resetting shafts and has clutched them to the meter so that they will be driven thereby. At the end of this movement shaft 169 has actuated the switch mechanism (Fig. 7) 179 to 189 so that the switch is now closed while shaft 53 has brought the ear 325 of lever 323 (Figs. 3, 9, 10 and 11) into contact with the plunger 277—291 of the pilot valve 249 so that additional movement of the ear will open the valve.

The lever 157 is then rotated an additional 16 degrees to its extreme position which is determined by pin 149 on the wrist plate striking pawl 115 and rotating it clockwise (Fig. 5) until ear 117 strikes the edge of control element 77.

The rotation of the lever produces an additional rotation of shafts 169 and 53 of substantially 7 degrees and the latter fully depresses the valve plunger to fully open the pilot valve 249 which is latched in this position by the ball clutch mechanism.

Upon release of lever 157, the switch rod spring 183 will rotate shaft 169, element 77, shaft 53 and lever 121 substantially 15 degrees to a position determined by the reengagement of the abutment 81 of element 77 with the dog 75. Further rotation of these parts is then prevented by spring 91.

The described rotation of lever 121 moves link 125, wrist plate 127 and lever 157 counterclockwise substantially 27.5 degrees so that the lever 157 occupies the running position. This movement of the lever by the switch spring is aided by the spring which returns the tripping pawl to its stop but the lost motion between the wrist plate and the link is not taken up in the counterclockwise direcion.

Since the pilot valve is open and the switch 189 is closed, the dispenser is conditioned to make a delivery of liquid whenever the nozzle valve 19 is opened by operating the trigger 21. As soon as this valve opens, the main or control valve 373 is also correspondingly opened as described above so that the delivery may proceed.

When the delivery is completed and the nozzle and main valves are closed, the operator will turn the lever 157 further in the counterclockwise direction (Fig. 4). The first 12 degrees of such rotation will not produce an effect on shafts 169 and 53 because the corresponding rotation of the wrist plate merely moves slot 131 until its right hand edge engages pin 129. The previously described lost motion is thus taken up in the reverse direction.

As the lever 157 is rotated further through substantially 13.5 degrees, the shafts 169 and 53 and element 77 rotate counterclockwise substantially 10 degrees to bring the interlock tooth 83 into position for engagement by latch pawl 105. Since the rotation of element 77 is transmitted to member 61 by the dog 75, the cam 111 will have released pin 109 of the latch pawl prior to the end of the described rotation to permit to engage tooth 83 under the action of the pawl spring. This engagement prevents the return of the levers 157 and 323 to their extreme positions although the switch is still closed and the pilot valve is still open.

A further counterclockwise movement of lever 157 through substantially 9.5 degrees produces a corresponding rotation of shafts 169 and 53 of substantially 8 degrees. Shaft 169 near the end of this movement, will have moved cam 179 sufficiently out of the path of rod 181 to permit spring 183 to open switch 189. Simultaneously, shaft 53 (Fig. 11) near the end of its corresponding movement will have moved the roller 316 to the high point of cam 320 and lever 311 will have rotated to its full clockwise position (Fig. 10) to release the ball clutch. As soon as this release is effected the pilot valve will be closed and its plunger will be returned to its initial position by springs 255 and 293 of the pilot valve mechanism.

Since the interlock tooth 83 and pawl 105 prevent counterclockwise rotation of lever 157 to a position which would reclose the switch and reopen the pilot valve and since the element 77 and member 61 have not rotated far enough to bring the tail of dog 75 within reach of lever 115, the operator is forced to return the lever 157 at least to its initial position before further delivery can be had. This necessitates an additional counterclockwise rotation of lever 157 through substantially 43.5 degrees and to insure that the interlock tooth 87 and pawl 105 are positively engaged, the lever may be rotated through an additional 6 degrees of overtravel. The shafts 169, 53, element 77 and member 61 are rotated correspondingly through substantially 48 and 5 degrees. The mechanism is stopped, in the maximum overtravel position by contact between the pin 89 on which the reset spring 91 is anchored, the ears 117 and 116 of lever 115 and fixed stop 135.

When the lever 157 is released, the reset spring returns the parts to their initial position as determined by tooth 87 and pawl 105.

It should be noted that about midway in the travel of element 77 between the position marked 1st ILT on S2 of the chart (Fig. 13) to the marked I.P, the second or intermediate interlock tooth 85 is engaged by pawl 105.

Also, as the wrist plate moves toward its initial position, tooth 139 of lever 157 is reengaged with tooth 137 of lever 115 by spring 147.

The rotation of shaft 53 through the 48 degree angle as described above also causes cam 191 to actuate its associated mechanism to declutch the registers from the meter and to clutch them to the resetting shafts 43, 45.

It will be noted from Figure 13 that due in part to the lost motion device between the link and wrist plate and in part to the characteristics of the mechanism connecting lever 157 with element 77, the over all total angular displacement of the lever between its overtravel and its extreme positions is substantially 112 degrees while the corresponding angular displacement of the element 77 and shafts 169 and 53 is only 86 degrees. The point desired to be made is the points of intersection of the chart ordinates with the L and S lines of the chart in Figure 13 do not necessarily indicate corresponding angular displacements of the elements represented by these lines. Instead, the corresponding displacements at which the important events of the cycle occur have been indicated by connecting the points with dashed lines. Thus in section L2S2 for example the point "V.C.L" on S2 is reached simultaneously by element 77 when the point "4th P. SW.O" on S2 is reached by lever 157 and the position "O.P." on L2 is reached by lever 157 when the element 77 reaches the point "O.P." on S2.

In order to further correlate the position of the ear 325 of lever 323 with Figure 13, the ear occupies the position indicated at "A" when the shaft 53 is in the over travel position "O.P." on lines S2 and S3 of the chart (Fig. 13); it occupies its full line position (Fig. 10) when the shaft occupies the initial or "I.P." position on lines S1, S2 and S3; it occupies the position marked "B" when the shaft has been displaced to the point "V.CL" on line S1 and opening of valve 249 impends; it occupies the position marked "C" when the shaft has been displaced (fully) to the point "V.O." on line S1 and, finally, it occupies the position "D" when the shaft has been returned to the point marked "V.C.L." on line S2 and is thus entirely clear of the plunger 277—291 at the time the ball clutch is released.

While the angular displacements of the various elements of the mechanism have been exactly specified, it is of course obvious that such specifications apply solely to the particular form of the device disclosed for purposes of illustration. The fundamental objective of the invention is to so correlate the various events of the cycles of the various mechanisms that the resetting of the registers is completed before or substantially at the time when the switch and valve operating mechanisms are freed for operation; to declutch the registers from the resetting means and clutch them to the meter before the switch closes and the pilot valve opens; to close the switch and either simultaneously therewith or shortly thereafter open the pilot valve and to hold these elements in these conditions without further attention of the operator so that he may make the delivery; thereafter as the mechanisms are further operated to advance their cycles, to establish an interlock so as to compel the completion of the cycles before another delivery can be made from the dispenser once the switch has been opened and the pilot valve has been closed; to open the switch and, substantially simultaneously therewith or slightly prior thereto, to close the pilot valve; to return the mechanisms to their initial conditions and releasably hold them there, all in the sequence stated.

To assist in insuring the return of the mechanisms to their initial positions it will be seen from Figure 4 that the lever 157, when it occupies any position in which the switch is closed, that is any position between the extreme position and the 4th position shown in this figure, blocks the entrance to the nozzle boot 389 and prevents the insertion of the nozzle therein with the guard thereof supported on the nozzle support 391 in the conventional manner. Thus the operator is compelled to move the lever 157 at least to a position in which the switch is off, the pilot valve is closed and the interlock is engaged so as to prevent reclosing the switch and reopening the valve, in order to dispose of the nozzle. In this condition of the mechanisms, as was pointed out above, the lever must be restored to its initial position before another delivery can be made.

It is obvious that various changes may be made in the form, structure and arrangement of parts of the specific embodiments of the invention disclosed herein for purposes of illustration, without departing from the spirit of the invention. Accordingly applicants do not desire to be limited to such specific embodiments but desire protection falling fairly within the scope of the appended claims.

What we claim is:

1. In a control mechanism for a liquid dispenser which includes a resettable register adapted to register the liquid dispensed, resetting means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, means for latching said control element in a spring loaded position, said resetting means including means, effective upon substantial completion of resetting, for releasing said latching means, trip means mounted for movement to and from a position for releasing said first connecting means, the improvement which comprises a pivotally mounted handle, a mechanism including a lost motion device, connected for operation by said handle and connected to operate said control member in directions correlative with the directions of movement of said handle, means for connecting said handle to move said trip means to releasing position in response to movement of said actuator in one direction through the distance permitted by said lost motion device and flow control means, including a valve operable under the control of said control element, to control the delivery of liquid from said dispenser.

2. In a control mechanism for a liquid dispenser which includes a resettable register adapted to register the liquid dispensed, indicator resetting means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, means for latching said control element in a spring loaded position, said resetting means including means, effective upon substantial completion of resetting, for releasing said latching means, trip means mounted for movement to and from a position for releasing said first connecting means, the improvement which comprises a pivotally mounted handle, a mechanism including a lost motion device and a pivotally mounted actuator, connected for operation by said handle and connected to rotate said control element in directions correlative with the direction of movement of said handle, second releasable connecting means for connecting said actuator to move said trip means to releasing position in response to movement of said mechanism in said first direction through the distance permitted by said lost motion means, means operable by said resetting means when resetting is substantially completed, for releasing said second connecting means, flow control means, including a switch and a valve movable to and from effective positions to start and stop the flow of liquid and means operable under the control of said control element, upon further movement of said handle in said first direction after the release of said latching means, for actuating said flow control means to start the flow of liquid.

3. The structure defined by claim 1 wherein said means operable under the control of said control element are constructed and arranged to cause said switch and valve to reach their effective and their ineffective positions substantially simultaneously.

4. In a control mechanism for a liquid dispenser which includes a resettable register adapted to register the liquid dispensed, said register having a frame, register resetting means, including a resetting member rotatably mounted on the frame adapted to reset the register when the resetting member is rotated in one direction, a spring connected to rotate said member in said direction, a control element rotatably mounted on the frame, first releasable connecting means for connecting said control element to rotate said member in the opposite direction, to load said spring, trip means operable to release said connecting means, means for latching said control element in a spring loaded position, said resetting member including means, effective upon substantial completion of its rotation in said one direction, for releasing said latching means, the improvement which comprises a pivotally mounted handle, an actuator pivotally mounted on said frame and connected for operation by said handle through distances proportional to the distances and in directions correlative with the directions of movement of said handle, a mechanism, including a lost motion device, connecting said actuator to rotate said control element, second connecting means for connecting said actuator to move said trip means to releasing position in response to movement of said actuator in one direction through the distance permitted by said lost motion means, said second connecting means being releasable, said resetting member including means for releasing said second connecting means and said latching means substantially at the completion of resetting, to free said actuator and said control element for further movement by said handle in said one direction and means including additional lost motion devices, a switch and a valve adapted to cooperate to start and stop the flow of liquid, and operated substantially simultaneously with said control element through said additional devices to start the flow at a predetermined point in said further movement of the control element.

5. The structure defined by claim 4 which includes means for moving said handle, actuator and control element in said second direction to reestablish said first connecting means, said additional lost motion devices serving to prevent movement of said switch and valve to stop the flow in response to the last mentioned movement of said handle.

6. In a control mechanism for a liquid dispenser which includes a resettable register adapted to register the liquid dispensed, resetting means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, first latching means for latching said control element in a spring loaded position, second latching means for latching said control element against rotation in said first direction by said spring when the spring is only partially loaded, said resetting means including means, effective upon substantial completion of resetting, for rendering said first and second latching means ineffective, trip means mounted for movement to and from a position for releasing said first connecting means, the improvement which comprises a pivotally mounted handle, a mechanism comprising a lost motion device, connected to operate said control element and connected for operation by said handle in directions correlative with the directions of movement of said handle, means operable by said handle to move said trip means to releasing position in response to movement of said handle in one direction through the distance permitted by said lost motion device, to cause resetting and the release of said first latching means, flow control means including a valve, means, including a second lost motion device, operated simultaneously with said control element for opening said valve at a predetermined position in the motion of said control element by said handle and mechanism upon further movement thereof in said one direction after the release of said first latching means, means for thereafter moving said handle, mechanism and control element in a second direction through said predetermined position to a second predetermined position to reestablish said first connecting means, said handle being movable thereafter in said second direction to a third predetermined position to render said second latching means effective, means for preventing the closing of said valve during the described motion of said control element in said second direction.

7. The structure defined by claim 6 which includes means operable by said handle for closing said valve upon further movement of said handle, mechanism and control element in said second direction beyond said third predetermined position, said second latching means serving to prevent the return of said handle to said first predetermined position so as to prevent reopening of said valve without resetting said register.

8. The structure defined by claim 6 which includes means for urging said valve closed and wherein said last named preventing means includes a normally effective clutch.

9. The structure defined by claim 8 which includes means operable by the handle for rendering said clutch ineffective upon further movement of said handle beyond said third predetermined position, said second latching means serving to prevent the return of said handle to said first predetermined position so as to prevent reopening of said valve without resetting the register.

10. In a control mechanism for a liquid dispenser which includes a resettable register adapted to register the liquid dispensed, resetting means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, first latching means for latching said control element in a spring loaded position, second latching means for latching said control element against rotation in said first direction by said spring when the spring is only partially loaded, said resetting means including means, effective upon substantial completion of resetting, for rendering said first and second latching means ineffective, trip means mounted for movement to and from a position for releasing said first connecting means, the improvement which comprises a pivotally mounted handle, a mechanism comprising a lost motion device, connected to operate said control element and connected for operation by said handle in directions correlative with the directions of movement of said handle, means operable by said handle to move said trip means to releasing position in response to movement of said handle in one direction through the distance permitted by said lost motion device, to cause resetting and the release of said first latching means, flow control means including a switch and a self closing valve, releasable means for holding the valve open, means, including additional lost motion devices, operated by said control element for closing said switch and opening said valve substantially simultaneously at a predetermined position in the motion of said control element by said handle and mechanism upon further movement thereof in said one direction after the release of said first latching means, means for thereafter moving said handle, mechanism and control element in a second direction through said predetermined position to a second predetermined position to reestablish said first connecting means, said handle being movable thereafter in said second direction to a third predetermined position to render said second latching means effective, one of said additional lost motion devices serving to prevent opening of said switch and said releasable holding means serving to prevent closing of said valve during the described motion of said control element in said second direction.

11. The structure defined by claim 10 which includes means operable by the handle for releasing said valve holding means, wherein said switch operating means opens said switch and said releasing means is operated to cause the valve to close upon further movement of said handle, mechanism and control element in said second direction beyond said third predetermined position, said second latching means serving to prevent the return of said handle to said first predetermined position so as to prevent reclosing of said switch and reopening of the valve without resetting said register.

12. In a control mechanism for a liquid dispenser which includes a register adapted to register the liquid dispensed and to be reset to zero, resetting means, including a rotatably mounted resetting member, adapted to reset said register when the member is rotated in one direction, a spring connected to rotate said member in said direction, a rotatably mounted control element, releasable connecting means for connecting said element to rotate said member in the opposite direction to load said spring, trip means for releasing said connecting means, first latching means for latching said element in a spring loaded position, second latching means for latching said element against rotation in said one direction by said spring from a position short of the spring loaded position, sadi resetting means including means, effective upon substantial completion of resetting, for rendering said first and second latching means ineffective, the improvement which comprises a handle mounted for movement in one direction from an initial position to a first position, a mechanism including a lost motion device for connecting said lever with said control element to move it in directions correlative with the directions of motion of said handle, said mechanism serving, with said element and said first latching means, to stop said lever in said first position, means operable by said lever during its movement to said first position for actuating said tripping means to release said connecting means, said spring and resetting means serving thereupon to reset the register and render said first and second latching means ineffective, said lever mechanism and control element being movable after such release through a second position, to an extreme position and in a reverse direction to said second position, means for returning said handle mechanism and element to said second position, a self closing valve, valve actuating means, including a second lost motion device, operable by said control element to open said valve during passage of said handle from said second to said extreme position, releasable holding means for preventing closure of said valve during the passage of said handle from said extreme position to said second position, said handle mechanism and control element being movable further in said reverse direction to a third position to render said second latching means effective and to a fourth position to release said holding means to cause said valve to close, said second latching means serving to prevent reopening of said valve without first resetting the register.

13. In a control mechanism for a liquid dispenser which includes a register adapted to register the liquid dispensed and to be reset to zero, resetting means, including a rotatably mounted resetting member, adapted to reset said register when the member is rotated in one direction, a spring connected to rotate said member in said direction, a rotatably mounted control element, releasable connecting means for connecting said element to rotate said member in the opposite direction to load said spring, trip means for releasing said connecting means, first latching means for latching said element in a spring loaded position, second latching means for latching said element against rotation in said one direction by said spring from a position short of the spring loaded position, said resetting means including means, effective upon substantial completion of resetting, for rendering said first and second latching means ineffective, the improvement which comprises a handle mounted for movement in one direction from an initial position to a first position, a mechanism including a lost motion device for connecting said lever with said control element to move it in directions correlative with the directions of motion of said handle, said mechanism serving, with said element and said first latching means, to stop said lever in said first position, means operable by said lever during its movement to said first position for actuating said tripping means to release said connecting means, said spring and resetting means serving thereupon to reset the register and render said first and second latching means ineffective, said lever mechanism and control element being movable after such release through a second position, to an extreme position and in a reverse direction to said second position, means for returning said handle mechanism and element to said second position, a switch, a self closing valve, switch and valve actuating means, including additional lost motion devices operable simultaneously with said control element to close said switch and open said valve during passage of said handle from said second to said extreme position, releasable means for holding the valve open, said one of said additional lost motion devices serving to prevent opening of said switch and said holding means serving to prevent closure of said valve during the passage of said handle from said extreme position to said second position, means for releasing said holding means, connected for operation with said control element, said handle, mechanism and control element being movable further in said reverse direction to a third position to render said second latching means effective and to a fourth position to operate said switch actuating means to open said switch and said releasing means to close said valve, said second latching means serving to prevent reclosure of said switch and reopening of said valve without first resetting the register.

14. In a control mechanism for a liquid dispenser which includes a frame, a housing panel on said frame, a nozzle support and a nozzle boot on said panel, a lever pivotally mounted on said panel for movement to and from positions blocking said boot and nozzle support, to prevent the positioning of a nozzle simultaneously on said support and in said boot, a resettable register mounted on the frame, adapted to register the liquid dispensed, register resetting means, including a rotatably mounted resetting member, adapted to reset said register when the member is rotated in a first direction, a spring connected to rotate said resetting member in said direction, a rotatably mounted control element, first releasable connecting means for connecting said element to rotate said resetting member in a second direction to load said spring, first latching means for latching said control element in a spring loaded position, second latching means for latching said control element against rotation by said spring when the spring is only partially loaded, said resetting means including means, effective upon substantial completion of resetting, for rendering said first and second latching means ineffective, trip means mounted for movement to and from a position for releasing said first connecting means, the improvement which comprises said pivotally mounted handle, a mechanism, comprising a lost motion device, connected to operate said control element and for operation by said handle in directions correlative with the directions of movement of said handle, means operable by said handle to move said trip means to releasing position in response to movement of said actuator in one direction through the distance permitted by said lost motion device, to cause resetting and to render said first and second latching means ineffective, a self closing valve, means operated by said control element for opening said valve at a predetermined position in the further motion of said control mechanism by said handle and mechanism in said one direction after the latching means are rendered ineffective, releasable means for holding said valve open, means for thereafter moving said handle mechanism and control element in a second direction through said predetermined position to a second predetermined position to reestablish said first connecting means and thereafter in said second direction to a third predetermined position to render said second latching means effective, said holding means serving to prevent closing of said valve during the described motion of said handle in said second direction, said handle serving to block said nozzle support and boot in all of the positions it occupies while said valve is open.

15. In a control mechanism for a liquid dispenser, a control valve having open and closed positions, a resettable register adapted to register the liquid dispensed, power means for resetting said register, a control element connected to open said valve, means for latching said control element with said valve closed, a pivotally mounted handle, actuating means connected for operation by said handle when it is moved in one direction, for causing said power means to reset said register, means operable by said power means substantially at the completion of resetting to release said latching means, said actuating means serving upon further movement of the handle in the same direction to move said control element to open said valve.

16. In a control mechanism for a liquid dispenser, a normally closed flow control valve, a resettable register adapted to register the liquid dispensed, power means for resetting said register, a control element, means connecting said control element to operate said valve, means for latching said control element with said valve closed, a pivotally mounted handle, actuating means connected for operation by said handle when it is moved in one direction, for causing said power means to reset said register and release said latching means, said actuating means serving upon further movement of the handle in the same direction to a predetermined position to move said control element to open said valve, releasable means for holding the valve open, second latching means disposed so as to become effective upon reverse movement of said handle from said predetermined position, to prevent return movement of said handle to said predetermined position without resetting said register, means operable by said handle, upon further reverse movement of said handle after said second latching means becomes effective, for actuating said releasable means to close said valve.

17. A control mechanism for a liquid dispenser including a shaft, means mounting said shaft for rotation, said control mechanism including manually operable means for rotating said shaft from an initial position to a predetermined extreme position, means for moving said shaft back to a position intermediate said first named positions upon release of said manually operable means, said latter means being operable for thereafter returning said shaft in a separate motion to said initial position, a self closing flow control valve, means operable by said shaft during its rotation to said extreme position for opening said valve, releasable means for holding said valve open during the movement of said shaft from said extreme to said intermediate position and additional means operable by said shaft during its return to said initial position for actuating said holding means to release said valve for closure.

18. The structure defined by claim 17 wherein said valve includes a reciprocable member, which reciprocates as said valve is opened and closed, and said releasable holding means includes a clutch constructed and arranged so as to act on said member to prevent movement thereof in a valve closing direction and so as to be ineffective to prevent movement of said member in the valve opening direction.

19. The structure defined by claim 18 in which said means operable by said shaft for actuating said holding means includes a cam mechanism for rendering said clutch ineffective to prevent movement of said reciprocable member in the valve closing direction after a predetermined movement of said shaft from said intermediate position toward said initial position.

20. In a flow control valve the combination of a valve body defining an inlet, an outlet and a valve seat disposed therebetween, a poppet type valve reciprocably mounted for opening and closing with respect to said seat and having a stem, a valve cap mounted on the body and a valve operating plunger reciprocably mounted in said cap, having one end extending out of the cap and the other end disposed in position to actuate said stem, sealing means for preventing the escape of fluid from said body past said plunger, means mounted for movement to and from an actuated position with respect to said plunger, said means serving to move said plunger in a valve opening direction when moved to said actuated position and serving to free said plunger when moved from said actuated position, yieldable means for urging said plunger and valve in a valve closing direction and releasable, unidirectional clutch means mounted on said cap including means normally engaging said plunger to prevent movement thereof in the valve closing direction when said actuating means moves from its actuated position.

21. The structure defined by claim 20 which includes clutch releasing means mounted on said cap, in operating relation with respect to said clutch means and for movement to and from clutch releasing positions.

22. The structure defined by claim 20 wherein said clutch means comprise yieldable means for normally holding the clutch means engaged with said plunger and means mounted on said cap, for movement in opposition to said yieldable means, to disengage said clutch means from said plunger, to permit closure of the valve.

References Cited in the file of this patent
UNITED STATES PATENTS

| | | |
|---|---|---|
| 2,035,202 | Smith | Mar. 24, 1936 |
| 2,126,103 | Fraser | Aug. 9, 1938 |
| 2,372,392 | Pletman | Mar. 27, 1945 |
| 2,595,259 | Hill et al. | May 6, 1952 |